United States Patent
Choi et al.

(10) Patent No.: US 8,880,254 B2
(45) Date of Patent: Nov. 4, 2014

(54) ENGINE STARTING CONTROL METHOD FOR HYBRID VEHICLE

(75) Inventors: Yong Kak Choi, Gyunggi-do (KR); Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 204 days.

(21) Appl. No.: 13/526,947

(22) Filed: Jun. 19, 2012

(65) Prior Publication Data
US 2013/0041535 A1 Feb. 14, 2013

(30) Foreign Application Priority Data
Aug. 11, 2011 (KR) .......................... 10-2011-0080320

(51) Int. Cl.
| | |
|---|---|
| *F16H 3/72* | (2006.01) |
| *B60W 20/00* | (2006.01) |
| *B60K 6/445* | (2007.10) |
| *B60W 10/06* | (2006.01) |
| *B60W 30/192* | (2012.01) |
| *B60W 10/08* | (2006.01) |
| *F16H 37/10* | (2006.01) |

(52) U.S. Cl.
CPC .............. *B60K 6/445* (2013.01); *B60W 20/00* (2013.01); *B60W 2710/081* (2013.01); *F16H 2037/102* (2013.01); *B60W 20/40* (2013.01); *B60W 2710/0644* (2013.01); *B60W 10/06* (2013.01); *B60W 2510/0638* (2013.01); *B60W 30/192* (2013.01); *Y02T 10/6239* (2013.01); *B60W 2510/0695* (2013.01); *B60W 10/08* (2013.01); *Y02T 10/6286* (2013.01); *F16H 3/728* (2013.01); *B60W 2510/0676* (2013.01); *B60W 2720/103* (2013.01); *B60W 2710/083* (2013.01); *Y02T 10/48* (2013.01)
USPC ............................................. 701/22; 123/375

(58) Field of Classification Search
USPC ............ 701/22, 110, 112, 113; 123/319, 320, 123/339.16, 339.18, 364, 350, 366, 375; 180/65.265, 65.21
See application file for complete search history.

(56) References Cited

U.S. PATENT DOCUMENTS

| | | | | |
|---|---|---|---|---|
| 7,159,555 B2 * | 1/2007 | Nohara et al. | ............ | 123/179.18 |
| 7,497,285 B1 * | 3/2009 | Radev | ................. | 180/65.225 |
| 8,002,058 B2 * | 8/2011 | Ishikawa | ............... | 180/65.265 |
| 8,100,207 B2 * | 1/2012 | Oba et al. | ................. | 180/65.285 |

FOREIGN PATENT DOCUMENTS

| | | |
|---|---|---|
| JP | 2010202151 A | 9/2010 |
| JP | 2011051480 A | 3/2011 |
| KR | 10-2000-0019322 | 4/2000 |

* cited by examiner

*Primary Examiner* — Dalena Tran
(74) *Attorney, Agent, or Firm* — Edwards Wildman Palmer LLP; Peter F. Corless

(57) ABSTRACT

Disclosed is an engine starting control method for a hybrid vehicle that includes a starting motor for starting an engine and a driving motor for driving a vehicle. More specifically, a control unit may be configured to accelerate a stopped engine, determine whether a current speed of the engine is greater than a predetermined value, inject fuel to the engine when the current speed of the engine is greater than the predetermined value, determine a torque of the starting motor based on a target speed of the engine, and control a speed of the engine based on the determined torque of the starting motor.

13 Claims, 5 Drawing Sheets

ENGINE STARTING CONTROL METHOD FOR HYBRID VEHICLE

CROSS-REFERENCE TO RELATED APPLICATION

This application claims priority to and the benefit of Korean Patent Application No. 10-2011-0080320 filed in the Korean Intellectual Property Office on Aug. 11, 2011, the entire contents of which are incorporated herein by reference.

BACKGROUND OF THE INVENTION (a) Field of the Invention

The present invention relates to an engine starting control method for a hybrid vehicle. More particularly, the present invention relates to an engine starting control method which may improve drivability in engine starting of a hybrid vehicle.

(b) Description of the Related Art

Generally, a hybrid vehicle includes a starting motor, a drive motor, an engine, at least one planetary gear set, and a plurality of friction elements. In addition a hybrid vehicle may realize a plurality of shift modes according to connection states of the planetary gear set and friction elements. The starting motor may be defined as a motor which rotates a crankshaft to start the engine, and the drive motor may be defined as a motor which drives the vehicle. The starting motor and the drive motor are supplied electrical energy from a battery, and a drive shaft is rotated according to selective operations of the drive motor and the engine.

In the hybrid vehicle provided with a powertrain like the one described above without a power transmission device such as a clutch, if an engine and a drive shaft are not be separated appropriate through disengagement of a power transmission device, vibrations due to engine friction and starting motor torque may be transmitted to a drive shaft when the engine is stopped. Also, when torque of a starting motor is excessively higher than engine friction produced when an engine is started, an inertia torque of the starting motor may be transmitted to a drive shaft and thus vibrations may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an engine starting control method for a hybrid vehicle which may minimize vibration in engine during starting and enhance drivability of the vehicle.

In an engine starting control method for a hybrid vehicle according to an exemplary embodiment of the present invention may include detecting that an engine is accelerating from a stopped position, determining, by a controller, whether a current speed of the engine is higher than a predetermined value, injecting, by a fuel injection system, fuel into a combustion chamber of the engine when the current speed of the engine is higher than the predetermined value, determining, by the controller, a torque of the starting motor according to a target speed of the engine, and controlling, by the controller, the speed of the engine according to the determined torque of the starting motor.

The torque of the starting motor may be determined based on a friction torque of the engine while the engine is being accelerated from a stopped state. The friction torque of the engine may be determined based on an engine operation condition which includes coolant temperature and engine rotation speed. The torque of the starting motor according to the target speed of the engine may be determined based on an error between the current speed of the engine and the target speed of the engine, and the friction torque of the engine.

In some exemplary embodiments of the present invention, the target speed of the starting motor may be determined based on the target speed of the engine. The target speed of the engine may be determined based on a predetermined speed profile regardless of driving conditions of the vehicle. Furthermore, the speed of the engine may be increased over a predetermined time interval, and the torque of the starting motor for accelerating the engine may be determined based on the target speed of the engine applied with the predetermined speed profile.

An engine starting control method may be applied to a hybrid vehicle that may include a first planetary gear set having a first sun gear, a first planetary carrier, and a first ring gear; a second planetary gear set having a second sun gear, a second planetary carrier continuously connected to the first ring gear and an output shaft, and a second ring gear; an engine continuously connected to the first planetary carrier and selectively connected to the second sun gear; a first motor/generator continuously connected to the first sun gear; a second motor/generator continuously connected to the second sun gear; a first clutch selectively connecting the first planetary carrier and the second ring gear; a second clutch selectively connecting the engine and the first sun gear; a first brake selectively connecting the first sun gear and a transmission case; and a second brake selectively connecting the second ring gear and the transmission case. Additionally, the first motor/generator may be operated as a starting motor and the second motor/generator may be operated as a drive motor.

The engine starting control method applied to the above described hybrid vehicle may include accelerating a stopped engine, determining, by a controller, whether a current speed of the engine is higher than a predetermined value, injecting, by a fuel injection system, fuel to the engine when the current speed of the engine is greater than the predetermined value, determining, by a controller, a torque of the starting motor according to a target speed of the engine, and controlling the speed of the engine according to the determined torque of the starting motor.

The torque of the starting motor may be determined by friction torque of the engine while the engine is being accelerated. The friction torque of the engine may be determined based on an engine operating condition including coolant temperature and engine rotation speed. The torque of the starting motor according to the target speed of the engine may be determined based on an error between the current speed of the engine and the target speed of the engine, and the friction torque of the engine.

The target speed of the starting motor may be determined by the target speed of the engine. The target speed of the engine may be determined by a predetermined speed profile regardless of driving conditions of the vehicle.

The speed of the engine may be increased over a predetermined time interval, and the torque of the starting motor for accelerating the engine may be determined based on the target speed of the engine applied with the predetermined speed profile.

As described above, according to the exemplary embodiment of the present invention, vibration may be minimized and drivability may be improved in engine starting due to controlling a starting torque according to running states of a vehicle.

BRIEF DESCRIPTION OF THE DRAWINGS

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DESCRIPTION OF SYMBOLS

Figure 1:
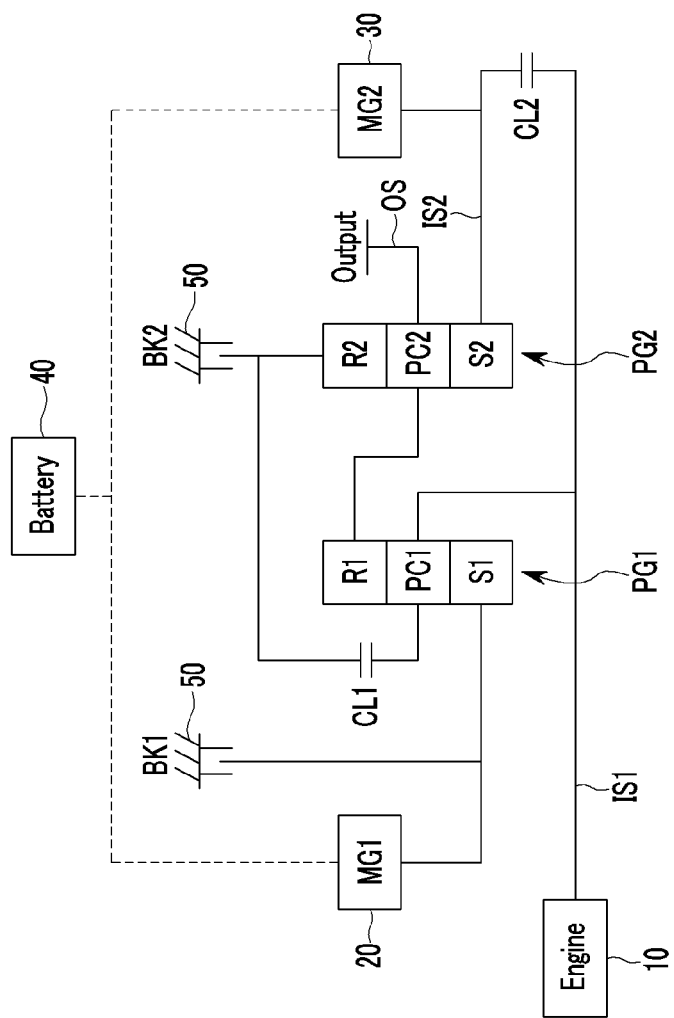
FIG. 1 is a schematic diagram of a powertrain of a hybrid vehicle according to an exemplary embodiment of the present invention.

10: engine
20: starting motor
30: drive motor
40: battery
50: transmission case
55: transmission
60: control unit
PG1: first planetary gear set
S1: first sun gear
PC1: first planetary carrier
R1: first ring gear
PG2: second planetary gear set
S2: second sun gear
PC2: second planetary carrier
R2: second ring gear
CL1: first clutch
CL2: second clutch
BK1: first brake
BK2: second brake
IS1: first input shaft
IS2: second input shaft
OS: output shaft

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In overall specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

FIG. 1 is a schematic diagram of a powertrain of a hybrid vehicle according to an exemplary embodiment of the present invention. As shown in FIG. 1, a powertrain to which a engine starting control method of a hybrid vehicle according to an exemplary embodiment of the present invention may be applied includes an engine 10, a starting motor 20, a drive motor 30, first and second input shafts IS1 and IS2, an output shaft OS, and first and second planetary gear sets PG1 and PG2.

The engine 10 transmits power to the first input shaft IS1. The starting motor 20 transmits power to the engine 10 and starts the engine 10 through the first planetary gear set PG1. The drive motor 30 transmits power to the second input shaft IS2. The motor 20 and the drive motor 30 are supplied electric power from a battery 40 and generate power, respectively.

The starting motor 20 and the drive motor 30 may be embodied as first and second motors/generators 20 and 30, and may be operated as a motor or a generator, respectively. In the engine starting control method for a hybrid vehicle according to an exemplary embodiment of the present invention, the first motor/generator 20 starts the engine 10, and thus, hereinafter, it is called a starting motor 20, and the second motor/generator 30 transmits power to the second input shaft IS2, and thus it is called a drive motor 30. However, the first and second motors/generators 20 and 30 may be operated for controlling engine speed, controlling output torque control, and so on according to operation conditions of a vehicle.

The first input shaft IS1 transmits power received from selective operation of the engine 10 to the first carrier gear PC1 of the first planetary gear set PG1. The second input shaft IS2 transmits power received from selective operation of the drive motor 30 to the second sun gear S2. The output shaft OS receives power from the second planetary gear set PG2 of the powertrain and outputs the power to the wheel accordingly.

The first planetary gear set PG1 may be a single pinion planetary gear set including a first sun gear S1, a first planetary carrier PC1, may also be a single pinion planetary gear set including a second sun gear S2, a second planetary carrier PC2, and a second ring gear R2 as operating members. The first planetary gear set PG1 and the second planetary gear set PG2 may be disposed on the same axis, and the first sun gear S2 may be continuously connected to the starting motor 20 and selectively connected to a transmission case 50 to apply a brake BK1.

The first planetary carrier PC1 may be continuously connected to the engine 10 and selectively connected to the second ring gear R2. The first ring gear R1 may be continuously connected to the second planetary carrier PC2, and the second sun gear S2 may be continuously connected to the drive motor 30 and selectively connected to the engine 10.

The second planetary carrier PC2 may be continuously connected to the output shaft OS. The second ring gear R2 may selectively connected to the transmission case 50 to apply the brake BK2.

The power train of the hybrid vehicle according to an exemplary embodiment of the present invention may include a plurality of friction elements CL1, CL2, BK1, and BK2 which connect the operating members of the first and second planetary gear sets PG1 and PG2 or the transmission case 50. The first clutch CL1 selectively connects the first planetary carrier PC1 and the second ring gear R2, and the second clutch CL2 selectively connects the second sun gear S2 and the second motor/generator 30 to the engine 10. The first brake BK1 selectively connects the first sun gear S1 to the transmission case 50, and the second brake BK2 selectively connects the second ring gear R2 to the transmission case 50.

Figure 2:
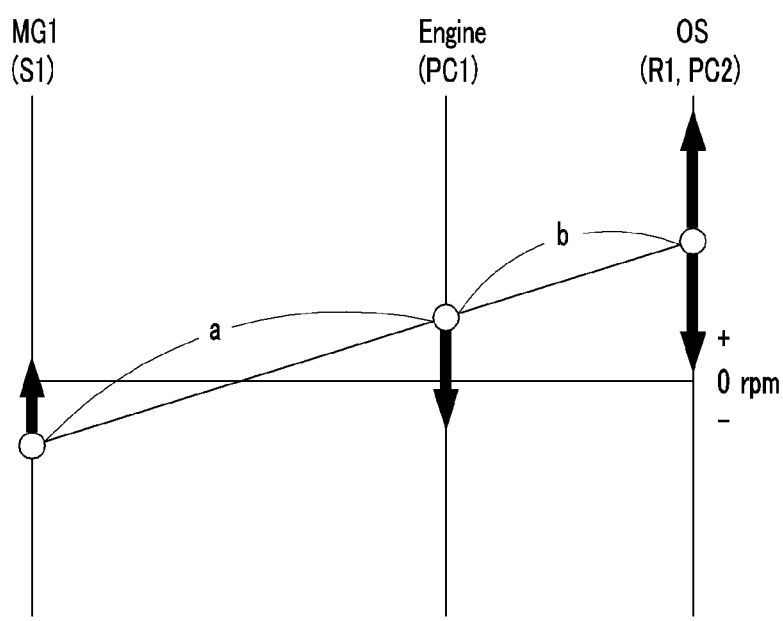
FIG. 2 is a lever diagram of the powertrain of FIG. 1 showing directions of speed and torque according to an exemplary embodiment of the present invention.

FIG. 2 is a lever diagram of the powertrain of FIG. 1 showing directions of speed and torque according to an exemplary embodiment of the present invention. As shown in FIG. 2, rotational speeds of the starting motor 20, the engine 10, and the output shaft OS are identical to the rotational speeds of the first sun gear S1, the first planetary carrier PC1, and the first ring gear R1, respectively.

Referring to FIG. 1, the starting motor 20, the engine 10, and the output shaft OS are continuously connected to the first sun gear S1, the first planetary carrier PC1, and the second planetary carrier PC2, respectively, and the second planetary carrier PC2 is continuously connected to the first ring gear R1.

The lever diagram of FIG. 2 is a lever diagram of the operating members of the first planetary gear set PG1. The lever diagram illustrates an exemplary state where the starting motor 20 starts the engine 10 and the vehicle is driven only by the drive motor 30. When the drive motor 30 powers the vehicle, the second brake BK2 is operated and the drive motor 30 rotates the second sun gear S2 and thus the second planetary carrier PC2 continuously connected to the output shaft OS correspondingly rotates. The engine 10 is started when the starting motor 20 rotates the first sun gear S1, the first ring gear R1 rotates with the second planetary carrier PC2, and the first planetary carrier PC1 continuously connected with the engine 10 correspondingly rotates. In this case, the second brake BK2 is operated, and the first clutch CL1, the second clutch CL2, and the first brake BK1 are not operated.

The engine 10 may be started by applying the torque of the starting motor 20 when rotation of the output shaft OS is substantially constant due to rotational torque and friction torque thereof. In this case, the torque of the starting motor 30 may be denoted as starting torque. Further, friction torque due to rotation of the engine 10 is denoted as engine friction torque.

In FIG. 2, the rotational torque and friction torque of the output shaft OS, and the starting torque and the engine friction torque are described with arrows. The upward directional arrow at the output shaft OS denotes the rotational torque, and the downward directional arrow at the output shaft OS denotes the friction torque. The rotational torque and the friction torque of the output shaft OS may be similar or identical. Thus, the output shaft OS may rotate substantially at a constant speed. When the starting torque is excessively greater than the engine friction torque, inertia torque of the starting motor may cause vibrations when the engine is started. By controlling the starting torque, the vibration may be minimized through the exemplary embodiment of the present invention.

Figure 3:
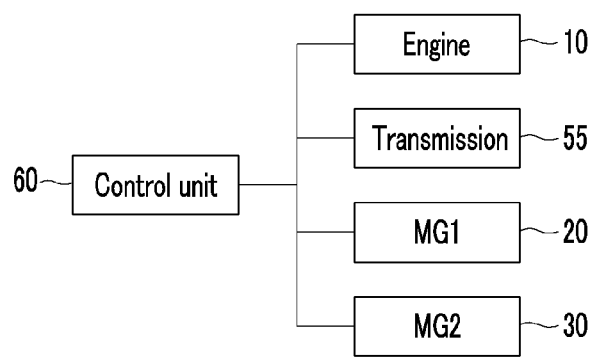
FIG. 3 is a block diagram showing the relationship of a control unit and constituent elements according to an exemplary embodiment of the present invention.

FIG. 3 is a block diagram illustrating the relationship of a control unit and constituent elements according to an exemplary embodiment of the present invention. As shown in FIG. 3, a control unit 60 may be configured to control the operations of the engine 10, a transmission 55, and the first and second motors/generators 20 and 30. Also, the control unit 60 receives operational condition signals of constituent elements and controls each element accordingly. In this case, the transmission 55 may be the transmission shown in FIG. 1 including the first and second planetary gear set PG1 and PG2 and the friction elements CL1, CL2, BK1, and BK2.

Figure 4:
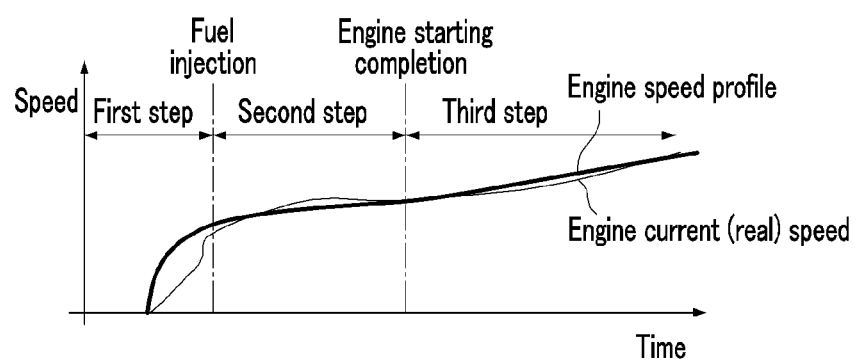
FIG. 4 is a graph showing current engine speed and target engine speed at each stage according to an exemplary embodiment of the present invention.

Hereinafter, referring to FIG. 4, a method for determining control value of the starting torque will be described in which the control unit is configured to control the starting torque. FIG. 4 is a graph showing engine current speed and engine target speed at each stage according to an exemplary embodiment of the present invention. As shown in FIG. 4, engine starting may be divided into three steps according to an exemplary embodiment of the present invention.

In the first step, the starting motor 20 provides power to the first shaft IS1 to provide rotational acceleration to the engine 10. In this case, the starting torque corresponds to the engine friction torque, and impact due to excessive starting torque may be prevented where frictional force of the engine 10 is changed from static frictional force to kinetic frictional force. The starting torque corresponding to the engine friction torque may be determined from a table of engine friction torques. The table may be established from experimental data including coolant temperature, frictional force of the engine 10 according to the rotational speed of the engine 10, and so on. In this case, anticipated engine friction torque is applied to the engine 10 and thus feed-forward control is realized to calculate the torque of the starting motor 20.

In the first step, since an error between the current (real) speed and the target speed of the starting motor 20 is insignificant, just the feed-forward control may be used. However, after the first step, the feed-forward control for determining the starting motor torque by anticipating the engine friction torque and feedback control using an error between the current speed and the target speed of the starting motor 20 may be used together to determine the torque of the starting motor. That is, the relationship of "starting torque=feed-forward+ feedback" may be applied, and the feed-forward and the feedback may be determined as follows.

feed-forward=−{$b/(a+b)$}×engine friction torque feedback=error×$P$ gain+$I$ gain×∫(error)$dt$ error=target $MG1$speed−current $MG1$speed target $MG1$speed={$(a+b)$×engine speed profile− $MG2$speed}/$b$ As described above, proportional integral control (PI control) may be used for the feedback calculation. In this case, the "a" and "b" may be length ratios of the lever diagram of FIG. 2, and are gear ratios of tooth number of the first sun gear S1 to tooth number of the first ring gear R1. Thus, although speeds of the starting motor 20, the engine 10, and the output shaft OS are changed, the ratios of the "a" and "b" are not changed. The P gain and the I gain are functions according to the sign and absolute error value between the target value and the current value of the starting motor speed. In this case, the P gain and the I gain may be obvious and determined by a person skilled in the art.

The second step is a follow-up control stage of the engine speed before completion of starting of the engine 10. When the speed of the engine 10 is increased to a value greater than a predetermined value in the first step, fuel injection is conducted and the engine speed follow-up control starts. In this case, the predetermined value may be an engine speed of which frictional force of the engine 10 is changed from static frictional force to kinetic frictional force.

The engine speed follow-up control refers to processes including determining the target speed of the starting motor 20 according to an engine speed profile of the engine 10, calculating the error between the current speed and the target speed of the starting motor 20, and feedback controlling according to proportional integral control (PI control). That is, in the second step, the starting torque may be determined by the relationship of "starting torque=feed-forward+feedback". In this case, the engine speed profile may be the target speed of the engine 10, and the engine speed profile may be applied so that uniform drivability may be achieved regardless of driving conditions.

The third step is a stage where the engine speed is stabilized after completion of starting of the engine 10. Once the engine has started after the first and second steps, the speed of the engine 10 is increased following a slight speed gradient in a predetermined interval so that drivability may be enhanced. That is, in the third step, the torque of the starting motor 20 for accelerating the engine 10 is determined by a relationship of "starting torque=feed-forward+feedback".

Figure 5:
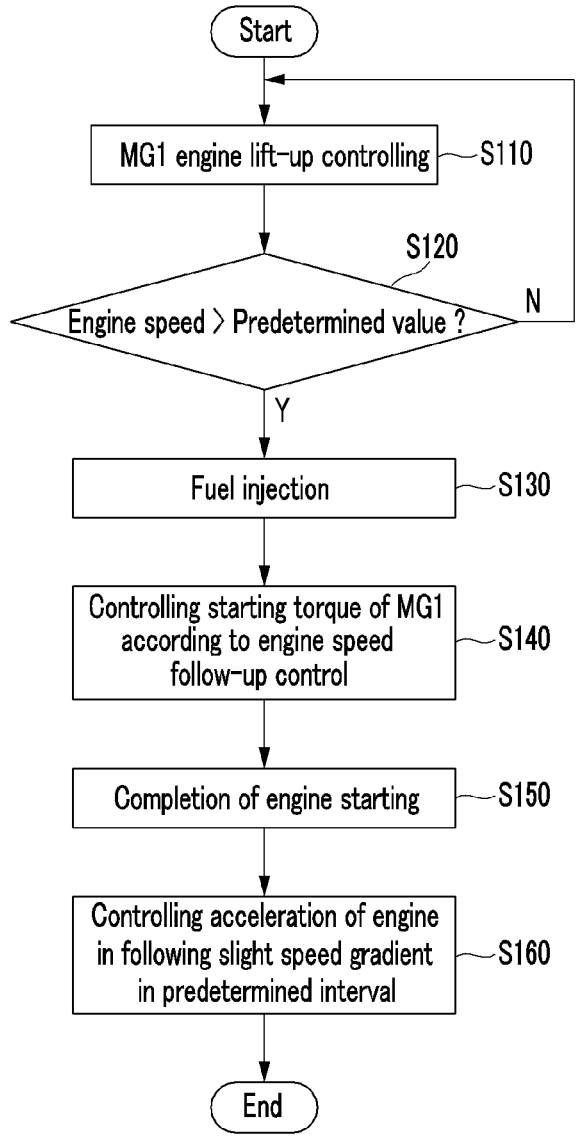
FIG. 5 is a flowchart of an engine starting control method of a hybrid vehicle according to an exemplary embodiment of the present invention.

FIG. 5 is a flowchart of engine starting control method of a hybrid vehicle according to an exemplary embodiment of the present invention. As shown in FIG. 5, when power of the engine 10 is required while driving a vehicle by the drive motor 30, starting of the engine 10 is carried out. The starting of the engine 10 is initialized by driving the starting motor 20 and increasing the speed of the engine 10 (lift-up controlling) at step S110. The starting torque of the staring motor 20 for accelerating the engine 10 is determined according to the feed-forward control for substituting the engine friction torque. The engine friction torque may be determined by a table established from experimental data including coolant temperature, frictional force of the engine 10 according to rotation speed of the engine 10, and so on.

When the engine 10 starting is initialized and the speed of the engine 10 is increased, the control unit 60 may determine the speed of the engine 10 is greater than the predetermined value at step S120. In this case, the predetermined value may be the engine speed of which frictional force of the engine 10 is changed from static frictional force to kinetic frictional force.

When it is determined that the speed of the engine 10 is not greater than the predetermined value, the speed of the engine 10 may be accelerated continuously at step S110. When it is determined that the speed of the engine 10 is greater than the predetermined value, fuel injection into the engine 10 may be initialized at step S130. When the fuel injection initiates, the starting torque of the starting motor 20 may be determined by the engine speed follow-up control at step S140.

The engine speed follow-up control refers to processes which include determining the target speed of the starting motor 20 according to an engine speed profile of the engine 10, calculating the error between the current speed and the target speed of the starting motor 20, and feedback controlling according to proportional integral control (PI control). In this case, the starting torque is determined by the relationship of "starting torque=feed-forward+feedback".

The speed of the engine 10 is controlled based on the determined starting torque, thus starting the engine in step S150. Thus, the speed of the engine 10 may be controlled according to the target speed of the engine 10. After the engine 10 is started, the speed of the engine 10 may be accelerated following a slight speed gradient in a predetermined interval to stabilize the engine 10 at step S160. In this case, the starting torque of the starting motor 20 for accelerating the rotational speed of the engine is determined by the relationship of "starting torque=feed-forward+feedback". That is, at steps S150 and S160, the speed of the engine 10 is controlled according to the torque of the starting motor 20 determined at step S140.

Furthermore, the control logic (of the control portion) of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As described above, in the exemplary embodiment of the present invention, the starting torque of the starting motor 20 when starting the engine 10 is determined by the calculation of feed-forward and the feedback, and thus the starting torque is controlled according to the running state of the vehicle. Thus, the vibration transmitted to a drive shaft and a vehicle body may be minimized and drivability may be improved.

In the exemplary embodiment of the present invention, although the powertrain shown in FIG. 1 is used for describing the starting method, it is not limited thereto. On the contrary, the starting method according to the exemplary embodiment of the present invention may be applied to various kinds of hybrid vehicles including a starting motor and a driving motor.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine starting control system for a hybrid vehicle, the control system including,
   a first planetary gear set having a first sun gear, a first planetary carrier, and a first ring gear;
   a second planetary gear set having a second sun gear, a second planetary carrier continuously connected to the first ring gear and an output shaft, and a second ring gear;
   an engine continuously directly connected to the first planetary carrier and selectively connected to the second sun gear;
   a first motor continuously directly connected to the first sun gear;
   a second motor continuously directly connected to the second sun gear;
   a first clutch selectively connecting the first planetary carrier and the second ring gear;
   a second clutch selectively connecting the engine and the first sun gear;
   a first brake selectively connecting the first sun gear and a transmission case;

a second brake selectively connecting the second ring gear and the transmission case, wherein the first motor is operated as a starting motor and the second motor is operated as a drive motor; and a control unit configured to:

accelerate the engine when the engine is stopped;

determine whether a current speed of the engine is greater than a predetermined value;

control injection of fuel into the engine when the current speed of the engine is greater than the predetermined value;

determine a torque of the starting motor based on a target speed of the engine; and control a speed of the engine based on the determined torque of the starting motor.

2. The control system of claim 1, wherein the torque of the starting motor is determined by friction torque of the engine when accelerating the stopped engine.

3. The control system of claim 2, wherein the friction torque of the engine is determined according to an engine operational condition including at least a coolant temperature and an engine rotational speed.

4. The control system of claim 1, wherein the torque of the starting motor according to the target speed of the engine is determined based on an error between the current speed of the engine and the target speed of the engine, and the friction torque of the engine.

5. The control system of claim 4, wherein a target speed of the starting motor is determined by the target speed of the engine.

6. The control system of claim 5, wherein the target speed of the engine is determined by a predetermined speed profile regardless of driving conditions of the vehicle.

7. The control system of claim 6, wherein:

the speed of the engine is controlled to be increased over a predetermined time interval; and the torque of the starting motor for accelerating the engine is determined by the target speed of the engine applied with the predetermined speed profile.

8. A non-transitory computer readable medium containing program instructions executed by a processor or controller, the computer readable medium comprising:

program instructions that control acceleration of a stopped engine of a hybrid vehicle that is continuously and directly connected to a first planetary carrier of a first planetary gear set and selectively connected to a second sun gear of a second planetary gear set;

program instructions that determine whether a current speed of the engine is greater than a predetermined value;

program instructions that control injection of fuel into the engine when the current speed of the engine is greater than the predetermined value;

program instructions that determine a torque of a starting motor a directly connected to a first sun gear of the first planetary gear set based on a target speed of the engine; and program instructions that control a speed of the engine based on the determined torque of the starting motor.

9. The non-transitory computer readable medium of claim 8, wherein the torque of the starting motor is determined by friction torque of the engine when accelerating the stopped engine.

10. The non-transitory computer readable medium of claim 9, wherein the friction torque of the engine is determined according to an engine operation operational condition including at least a coolant temperature and an engine rotation rotational speed.

11. The non-transitory computer readable medium of claim 8, wherein the torque of the starting motor according to the target speed of the engine is determined based on an error between the current speed of the engine and the target speed of the engine, and the friction torque of the engine.

12. The non-transitory computer readable medium of claim 11, wherein a target speed of the starting motor is determined by based on the target speed of the engine.

13. The non-transitory computer readable medium of claim 12, wherein the target speed of the engine is determined based on a predetermined speed profile regardless of driving conditions of the vehicle.

* * * * *